United States Patent [19]

Connick et al.

[11] 4,066,790

[45] Jan. 3, 1978

[54] CANNED MEAT PRODUCTS OF IMPROVED TENDERNESS

[75] Inventors: Francis G. Connick, Downers Grove; Harry F. Bernholdt, Lombard, both of Ill.

[73] Assignee: Swift & Company, Chicago, Ill.

[21] Appl. No.: 643,304

[22] Filed: Dec. 22, 1975

[51] Int. Cl.$^2$ ............................................... A23L 1/31
[52] U.S. Cl. ........................................... 426/8; 426/56
[58] Field of Search ................... 426/8, 56, 58, 59, 63, 426/61; 195/63, 68

[56] References Cited

U.S. PATENT DOCUMENTS

| | | | |
|---|---|---|---|
| 2,305,479 | 12/1942 | Komarik | 426/8 |
| 2,321,623 | 6/1943 | Ramsbottom et al. | 426/56 |
| 3,037,870 | 6/1962 | Schleich et al. | 426/58 |
| 3,166,423 | 1/1965 | Sleeth et al. | 426/58 |
| 3,533,803 | 10/1970 | Schack et al. | 426/56 |

*Primary Examiner*—Lionel M. Shapiro
*Attorney, Agent, or Firm*—Edward T. McCabe; Charles E. Bouton

[57] ABSTRACT

Canned meat items that are subjected to pasturizing temperature treatment are first treated with an enzyme, such as bromelin, which will tenderize the meat and then be inactivated by the pasturizing temperatures.

6 Claims, No Drawings

CANNED MEAT PRODUCTS OF IMPROVED TENDERNESS

This invention relates to the production of tenderized meat products and more particularly relates to the production of enzyme tendered canned meat products.

The use of proteolytic enzymes for the tendering of meats has been known for generations. Papain has been employed in a variety of ways to tender meats. This has included application to the surface of meat cuts, injection by stitch pumping, etc. and also the ante-mortum injection of live cattle through the vascular system shortly prior to slaughter. Combinations of enzymes such as combinations of papain and bromelin have been used in certain applications such as disclosed in the Sleeth, et al. U.S. Pat. No. 3,166,423 and Bernholdt U.S. Pat. No. 3,549,385. It is also known that relatively low quality and tough meat intended to be subdivided and used in canned meat products such as stews could also be benefited by treatment with enzymes, such as papain, bromelin and others. In the latter regard, the Schack et al. U.S. Pat. No. 3,533,803 teaches that the thermal treatment processing of such canned foods will activate the enzyme in the meat pieces and to avoid overtenderization, the enzyme near the surfaces of the pieces should be inactivated prior to the in-can thermal processing.

Nevertheless, with many canned meat items, it has heretofore not been believed possible to enzyme treat the meat as substantial quantities of enzyme would remain available in the meat following processing and would become reactivated by consumer preparation to result in overtendered product. Furthermore, enzymes have not been known to have been commercially utilized in meat products other than beef. However, many of these products, such as pasturized canned hams, vary widely in tenderness between individual items of product, some of which are tough and result in consumer dissatisfaction. For instance, canned hams may include either whole hams (a hind quarter of a carcass having three major muscles — inside, outside and knuckle) or sections thereof such as the individual muscles or parts thereof. Each of the muscles present in a whole ham, however, has individual characteristics of tenderness, with the outer muscle generally being less tender than the other portions and the knuckle muscle, if properly trimmed of connective tissue, being more tender than the other portions.

Accordingly, it would be of advantage to meat processors and canners to be able to enzyme tender their products if they could be certain that the enzyme was substantially irreversibly inactivated when the products leave their control. Heretofore, it was not believed possible to accomplish this in products which are only heated to pasteurization temperatures because such temperatures are inadequate to inactivate or destroy the enzyme papain believed to be necessary to obtain adequate tenderization.

Accordingly, it is an object of the present invention to devise a method for enzyme tendering canned meat products whereby substantially all of the enzyme is inactivated prior to the time the product reaches a consumer.

It is another object of the present invention to devise an improved canned meat product which has been treated with enzymes and the enzyme tendering has been substantially completed during processing.

It is still another object of the present invention to provide an improved curing pickle formula useful in the controlled tenderization of canned meat products.

We have found that canned meat products may be controllably tenderized by the meat processor and canner where such products have a very small amount of an enzyme added and where said enzyme has characteristics of proteolytic activity and thermal destruction at temperatures less than those normally used in the canning process to achieve destruction of pathogenic organisms.

This invention is accordingly applicable to so-called "refrigerated" canned meats which are processed to pasteurization temperatures as distinguished from sterilization temperatures. Such pasteurized items are most usually stored at refrigerated conditions. The invention may also be applicable to meats that are processed to pasteurization temperatures and stored frozen, or dried and stored substantially at ambient temperatures. The greatest benefit of the present invention will be obtained in relatively large solid meat pieces as contrasted to ground meat and even small meat pieces which are usually regarded as being tendered because of the small particle size. While reference has been made to "canned" meats, it is intended that this term will also apply, for purposes of this description, to other types of containers as well as metal cans; and unless otherwise specified, reference to canned meat and to meat placed in and/or sealed in a container are to be similarly construed and limited to those intended for pasteurization type heat treatment.

According to the present invention, a proteolytic enzyme that is functional at temperatures not substantially exceeding 150° F. and which may be inactivated by exposure to temperatures in the minimum range necessary for destruction of pathogens, is first introduced into meat items. This is preferably done by combining the enzyme with a liquid curing pickle formula which is used to treat the meat as by injection therein. Thereafter the meat is sealed in a container and gradually heat processed to an internal pasteurizing temperature of 150°-185° F. for a period of time sufficient to inactivate the enzyme. The heat processing is carried out in a manner so as to gradually increase the meat temperature over a time period that allows the enzyme to tenderize the meat fibers, and the maximum temperature is maintained for a sufficient time to both destroy pathogenic organisms and to render permanently inactive substantially all of the added enzyme present in the meat. Thereafter the product is cooled and moved into trade channels for delivery to consumers. The consumers in turn will normally remove the meat from the container and heat and recook it to individual taste and preference conditions. Sometimes the consumer holds the product at elevated serving temperatures for extended periods. The products of the present invention will not normally present any substantial amount of added enzyme that may become functional in the hands of the consumer. However, in some instances a small amount of an additional enzyme, such as papain, active at higher temperatures, may also be included in products that the producer believes will be further benefited by additional tenderization in the hands of the consumer.

A preferred application of the invention is in the manufacture of canned ham and canned ham products. The proteolytic enzyme found to be most suitable is bromelin, which is a plant derived enzyme that is readily available on the commercial market in substantial quantity and at reasonable cost. Bromelin is known to be most active as a meat tenderizer at temperatures of about 140° and may be active to lesser degrees within a temperature range of possibly 100°–150° F. Most importantly, bromelin can be completely inactivated by heat processing at temperatures as low as 150°–170° F. Other enzymes which display proteolytic activity and may be inactivated at substantially the same or lower temperatures may be useful in this invention.

While papain is the most widely used enzyme for meat tenderization and is sometimes used in combinations with bromelin, it is inappropriate for the present purpose of controlled tenderization by the processor as it is not destroyed or inactivated at temperatures normally associated with the processing and reheating or cooking of pasteurized meat items. Papain is active at temperatures of about 120°–170° F. and is temperature inactivated only by prolonged exposure to boiling or higher temperatures. Thus where papain (and other enzymes having similar functional characteristics, temperature-wise) is added to meat that is canned and pasteurized it will tenderize the meat during the canning process and may remain available and further tenderize the meat during preparation by the consumer. Thus the tenderizing feature cannot be completely controlled by the processor using papain.

The preferred application involves the addition of very small amounts of bromelin to virtually any normal curing pickle formula, such amounts being devised so as to introduce about 0.2 to 4.0 parts per million (ppm) bromelin enzyme in the meat tissue (0.09 mg/lb to 1.8 mg/lb of meat). To illustrate, where the pickle is added to the meat in the amount of 15% of the uncured weight, bromelin may be added in amounts of 2 ppm to about 20 ppm of the pickle formula. For best results, the pickle should be introduced by techniques that will evenly distribute it throughout the meat tissue. Several well known techniques are available such as soaking, stitch pumping, and vascular injection.

An optional step to further improve the uniformity of distribution of curing pickle and enzyme throughout the meat, and thereby enhance uniformity of tenderness, is to massage or agitate the meat after pickle introduction and before canning. This step can be performed on individual meat pieces or, more economically, on several pieces simultaneously. Virtually any mechanical means capable of working and kneading meat pieces may be utilized; and it is permissible to perform the step with or without the presence of a liquid medium such as additional quantities of curing pickle. For instance, a churn type of device or tumbling equipment known in the meat industry and having slowly oscillating or rotating paddles may be employed to agitate meat pieces for a period of two to three hours. This action is believed to assist distribution of the curing pickle solution uniformly throughout the meat tissue and to possibly mascerate or abrade or otherwise weaken the surfaces of meat tissues (both externally and internally of the meat pieces). At any rate it has been found that such massaging and agitation contribute to the development of tenderness in the final product and has an effect that is additive to the presence of enzyme.

Following the curing steps (and massaging if desired) the meat, such as hams, are placed in containers, such as "pear" shaped cans, and vacuum sealed using standard canning practices. The canned products are then heat processed through normal temperature and time conditions which are usually devised to raise the internal temperature of the product to about 150°–160° F. For instance, 3-lb. canned hams may be processed through tanks of water held at 170° F. for a period of 120 minutes; whereas 10-lb. canned hams require about 285 minutes in 170° F. water. The precise temperatures and times will depend on several factors such as weight and shape as is well known in the art.

During the aforementioned processing, the bromelin distributed throughout the meat will gradually pass through a stage of activity when it will act to tenderize the meat fibers as the temperature of the meat increases through the enzyme activity range. Furthermore, virtually all of the enzyme will become inactivated as the various portions of the meat reach the maximum processing temperature. It will be noted that a temperature gradient will be established as heat penetrates inwardly from the outer portion with the center of the meat being relatively cooler than the outer portion. Thus if any enzyme is left inactivated in the meat it will be limited to a very small amount confined to a small area in the center thereof. Even this is not likely, however, since the minimum center temperature for U.S.D.A. requirement is 150° F.

Thereafter the product is cooled and refrigerated and distributed to the consumer for cooking and consumption at which time no significant added enzyme will be present to soften the meat.

EXAMPLES I–VI

Several cases of paired, as to left and right, hams from the same animal were prepared. Three pound canned hams were processed under identical conditions, excepting the amount of bromelin added to the curing pickle. The basic ratio of pickle formula ingredients was 66.6% saturated brine, 21.25% water, 8.765% liquid dextrose 3.0% sodium tripolyphosphate, 0.2% sodiumerythorbate 0.125% sodium nitrite and smaller quantities of bromelin.

All hams were injected or stitch pumped to 115% of the uncured weight so as to have the following amounts of bromelin present:

| Lot | Pickle | | Meat | |
|---|---|---|---|---|
| | bromelin | ppm | bromelin | ppm |
| I | 30 | ppm | 4–6 | ppm |
| II | 20 | ppm | 3–4 | ppm |
| III | 10 | ppm | 1–2 | ppm |
| IV | 5 | ppm | 0.5–1.0 | ppm |
| V | 2 | ppm | 0.2–0.5 | ppm |
| VI | 0 | ppm | 0 | ppm |

Each ham was canned in three pound pear-shaped cans and 1 oz. liquid gelatin was added to each can after which the cans were closed with a minimum of 20 inches of vacuum, preferably 25 inches. The closed cans were placed in 170° F. circulating water cook tank and processed until a minimum of 150° F. was reached after approximately 2 hours. The cooked product was chilled in water at 40°–45° F. for approximately 1 hour, or until the internal temperature of the product reached about 80° F. or less. The finished product was held in refrigerated storage 35°–40° F. until tested.

Sample hams of each lot were taken from storage for sensory panel testing by a panel of ten persons. All sample hams were heated in ovens at 325° F. until an internal temperature of 125° F. was reached. The hams were then sliced and examined and eaten by the panel members. A summary of the examination of the samples is as follows:

Lot Summary of Observations

I Hams when sliced fell apart and were considered too soft and tender upon eating.
II Hams when sliced fell apart slightly and were considered somewhat soft and overtender upon eating.
III Hams when sliced were quite firm and considered acceptable for tenderness upon eating.
IV Hams when sliced were firm, tender and considered acceptable when eaten.
V Hams when sliced were firm, fairly tender and considered acceptable when eaten.
VI Hams when sliced were firm, relatively tough and only slightly acceptable when eaten.

These examples show that the hams of Lots III and IV containing 0.5-2.0 ppm bromelin, were noticeably superior and preferred whereas the hams of lot V (0.2-0.5 ppm bromelin) were improved over the control lot (lot VI – no bromelin). The hams of lot II (3.0-4.0 ppm bromelin), while beginning to show characteristics of overtenderization, were regarded as superior to the control lot. Those hams of lot I (4.0-6.0 ppm bromelin) were regarded as undesirably overtendered. Thus the examples show improved results at 0.2-4.0 ppm bromelin.

Additional examples further show a general superiority of bromelin tendered hams over non-tendered hams and a preference for the lower portion of the working range of bromelin in canned hams. These examples also illustrate that individual eating preference (such as a taste for salt) greatly influence the results of testing.

EXAMPLES VII and VIII

Two groups of three pound canned hams were prepared, similar to those of Examples I-VI, at different times. In the first group (Example VII) the pickle solution contained 17.6% salt (NaCl) and 20 ppm bromelin, to give approximately 2.5% salt and 2 ppm bromelin in the meat. In the second group (Example VIII) the pickle solution contained 17.6% salt (NaCl) and 10 ppm bromelin, to give approximately 2.5% salt and 1 ppm bromelin in the meat. The hams were distributed to households where they were prepared and consumed. Each household had been given a corresponding control ham during a preceding week which had been prepared in the same manner but where bromelin was omitted. Members of the household were queried on a number of factors with the following results:

| FACTOR | EXAMPLE VII | | | | EXAMPLE VII | | | |
|---|---|---|---|---|---|---|---|---|
| A. Saltiness (in %) bromelin treated | Total | Outside Muscle | Inside Muscle | Knuckle | Total | Outside Muscle | Inside Muscle | Knuckle |
| Much too salty | 8 | 16 | 4 | 4 | 1 | — | 2 | — |
| A little too salty | 19 | 16 | 25 | 17 | 11 | 12 | 4 | 16 |
| About right | 70 | 60 | 71 | 79 | 80 | 84 | 77 | 82 |
| Not quite enough | 3 | 8 | — | — | 7 | 4 | 15 | 2 |
| Not nearly enough | — | — | — | — | 1 | — | 2 | — |
| (No comparison data with control hams) | | | | | | | | |
| B. Tenderness (in %) bromelin treated | | | | | | | | |
| Much too tender | 7 | 12 | 4 | 4 | — | — | — | — |
| A little too tender | 16 | 20 | 4 | 25 | 4 | 4 | 4 | 4 |
| About right | 76 | 64 | 92 | 71 | 78 | 78 | 75 | 80 |
| A little too tough | 1 | 4 | — | — | 14 | 12 | 17 | 14 |
| Much too tough | — | — | — | — | 4 | 6 | 4 | 2 |
| Without bromelin | | | | | | | | |
| Much too tender | — | — | — | — | — | — | — | — |
| A little too tender | 4 | — | 4 | 8 | 3 | 4 | 2 | 2 |
| About right | 61 | 52 | 68 | 63 | 57 | 48 | 59 | 66 |
| A little to tough | 35 | 48 | 28 | 29 | 33 | 38 | 33 | 28 |
| Much too tough | — | — | — | — | 7 | 10 | 6 | 4 |
| FACTOR | EXAMPLE VII | | | | EXAMPLE VIII | | | |
| C. General Evaluations on a scale of 1 (poor) to 10 (excellent) | Total | Outside Muscle | Inside Muscle | Knuckle | Total | Outside Muscle | Inside Muscle | Knuckle |
| Flavor-tendered | 6.0 | — | Not Available | — | 6.6 | 6.3 | 6.9 | 6.5 |
| not tendered | 6.3 | — | " | — | 5.6 | 6.0 | 5.4 | 5.4 |
| Texture Tendered | 5.8 | — | " | — | 6.1 | 6.0 | 6.1 | 6.1 |
| not tendered | 5.8 | — | " | — | 5.2 | 5.4 | 4.7 | 5.6 |
| Sliceability - percentage of households reporting as "poor" | | | | | | | | |
| Tendered | 32 | 26 | 33 | 38 | 17 | 13 | 12 | 27 |
| Not tendered | 8 | 4 | 12 | 8 | 13 | 6 | 10 | 23 |
| D. Overall Preference - percentage | | | | | | | | |
| Tendered | 47 | 44 | 50 | 48 | 57 | 62 | 50 | 59 |
| Not tendered | 43 | 48 | 33 | 48 | 32 | 26 | 39 | 30 |
| No preference | 10 | 8 | 17 | 4 | 11 | 12 | 11 | 11 |

These data are believed to demonstrate that the present invention results in a significant improvement in consumer acceptance of canned ham products particularly where Example VII is discounted due to the excessive salt level. It should be particularly noted that the range of characteristic variations between products from the three muscles is narrowed for the tendered product and this is most apparent at the lower enzyme level (Example VIII).

A further example demonstrates that the preferred process of the present invention results in a product wherein all of the tenderizing potential of the added enzyme is utilized by the processor and substantially no active enzyme is available when the product is prepared by the consumer.

EXAMPLE IX

Several three pound canned hams, processed similar to the preceding examples with 2 ppm level of Bromelin in the meat, were canned and cooked to a minimum internal temperature of 150° F. After being stored at 35°–40° temperature, the canned hams were sliced cold and sampled for tenderness. The same meat was then baked in an oven for 1½ hours at 325° F. These hams were evaluated for tenderness and rated numerically by a number of trained panelists. Half of each ham tested was then placed in a home-type refrigerator and held overnight prior to being reheated the following day. The same panelists re-evaluated the hams for tenderness and no significant difference could be found between the refrigerated product, baked product, or reheated baked product.

Obviously many modifications and variations of the invention as hereinbefore set forth may be made without departing from the spirit and scope thereof, and, therefore, only such limitations should be imposed as are indicated in the appended claims.

We claim:

1. An improved method for producing a pasturized canned meat item of superior tenderness said method comprising: introducing into said meat item a functionally sufficient quantity of bromelin enzyme capable of complete thermal inactivation by temperatures within the range of 150°–170° F; sealing said meat item containing said enzyme into a container, said container being for delivery of the meat to consumers; and processing the sealed container through a single step of heating to pasturizing conditions that will gradually increase the meat temperature to a level within the range of 150°–185° F so as to first activate said enzyme to tenderize all portions of the meat at temperatures below 150° F and then inactivate said selected enzyme.

2. The process of claim 1 wherein the sealed container is heat processed to raise the temperature of said meat item to conditions sufficient to destroy pathogenic organisms and the selected enzyme has characteristics of proteolytic activity during the raise of temperature and to also be inactivated by the final conditions attained by said meat item.

3. The process of claim 1 wherein the meat item is massaged after introducing said enzyme thereto.

4. The process of claim 2 wherein the meat is ham, the selected enzyme is bromelin and the sealed container is heat processed in liquid at about 170° F.

5. The process of claim 1 wherein the selected enzyme is added to the meat in a quantity of about 0.2–4.0 ppm of the meat.

6. The process of claim 1 wherein the enzyme bromelin is added to the meat in combination with a liquid pickle formula used in curing the ham wherein the enzyme constitutes about 2.00–20 ppm or the pickle formula and said formula is added to the ham in a quantity of about 15% of the weight thereof.

* * * * *